United States Patent
Eckert et al.

(10) Patent No.: US 11,129,029 B2
(45) Date of Patent: Sep. 21, 2021

(54) ROAD-SIDE NETWORK NODE AND METHOD TO OPERATE THE ROAD-SIDE NETWORK NODE

(71) Applicant: Robert Bosch GmbH, Stuttgart (DE)

(72) Inventors: Kurt Eckert, Ditzingen (DE); Frank Hofmann, Hildesheim (DE); Nadia Brahmi, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/652,823

(22) PCT Filed: Sep. 19, 2018

(86) PCT No.: PCT/EP2018/075305
§ 371 (c)(1),
(2) Date: Apr. 1, 2020

(87) PCT Pub. No.: WO2019/091646
PCT Pub. Date: May 16, 2019

(65) Prior Publication Data
US 2020/0236556 A1    Jul. 23, 2020

(30) Foreign Application Priority Data

Nov. 13, 2017   (EP) .................................. 17201347

(51) Int. Cl.
*H04W 16/14*   (2009.01)
*H04W 4/40*    (2018.01)
(Continued)

(52) U.S. Cl.
CPC ............ *H04W 16/14* (2013.01); *H04W 4/40* (2018.02); *H04W 56/001* (2013.01);
(Continued)

(58) Field of Classification Search
CPC combination set(s) only.
See application file for complete search history.

(56) References Cited

U.S. PATENT DOCUMENTS 9,179,475 B2 * 11/2015 Koleszar .............. H04W 74/02
10,757,485 B2 * 8/2020 Al-Stouhi ............ G07C 5/008
(Continued)

FOREIGN PATENT DOCUMENTS

| WO | 2017027355 A1 | 2/2017 |
|----|---------------|--------|
| WO | 2017033486 A1 | 3/2017 |
| WO | 2017052488 A1 | 3/2017 |

OTHER PUBLICATIONS

International Search Report for PCT/EP2018/075305, dated Oct. 9, 2016.
(Continued)

*Primary Examiner* — Steven S Kelley
(74) *Attorney, Agent, or Firm* — Norton Rose Fulbright US LLP; Gerard Messina

(57) ABSTRACT

A road-side network node for operation in an adhoc radio communications network is provided. The road-side network node includes a processor, a memory, a radio module, and an antenna. The road-side network node is configured to: determine data to be transmitted via an adhoc radio channel; determine or provide an adhoc time slice reserved for transmissions via the adhoc radio channel; and start a transmission of the data via the adhoc radio channel during the adhoc time slice.

8 Claims, 7 Drawing Sheets

(51) Int. Cl.
    *H04W 56/00*     (2009.01)
    *H04W 72/02*     (2009.01)
    *H04W 74/08*     (2009.01)
    *H04W 84/18*     (2009.01)

(52) U.S. Cl.
    CPC ....... *H04W 72/02* (2013.01); *H04W 74/0808* (2013.01); *H04W 84/18* (2013.01)

(56) References Cited

U.S. PATENT DOCUMENTS

| | | | |
|---|---|---|---|
| 10,838,430 B2 * | 11/2020 | Guo | H04W 56/0025 |
| 10,952,043 B2 * | 3/2021 | Nguyen | H04W 56/0015 |
| 2009/0279462 A1 * | 11/2009 | Luo | H04L 47/50 370/310 |
| 2015/0148053 A1 * | 5/2015 | Patel | H04W 56/001 455/452.1 |
| 2016/0277174 A1 * | 9/2016 | Burnic | H04B 1/3816 |
| 2016/0295624 A1 | 10/2016 | Novlan et al. | |
| 2017/0238270 A1 * | 8/2017 | Shen | H04W 56/00 370/336 |
| 2017/0251486 A1 * | 8/2017 | Hu | H04W 72/10 |
| 2017/0261486 A1 | 9/2017 | Feng et al. | |
| 2019/0069052 A1 * | 2/2019 | Al-Stouhi | H04W 4/46 |
| 2019/0166533 A1 * | 5/2019 | Li | H04W 76/27 |
| 2020/0120567 A1 * | 4/2020 | Li | H04W 76/27 |

OTHER PUBLICATIONS

"802.11P-2010—IEEE Standard for Information Technology—Local and Metropolitan Area Networks—Specific Requirements—Part 11: Wireless LAN Medium Access Control (MAC) and Physical Layer (PHY) Specifications, Amendment 6: Wireless Access in Vehicular Environments", 2010, pp. 1-51.
ETSI TS 102 687 V1.1.1, 2011, pp. 1-45.
ETSI EN 302 663 V1.2.0, 2012, pp. 1-24.
3GPP TS 36.300 V14.2.0, 2017, pp. 1-330.
Intel Corporation: LYE-V2V coexistence with DSRC Technology. Discussion and Decision, Meeting (2016), pp. 1-8.

* cited by examiner

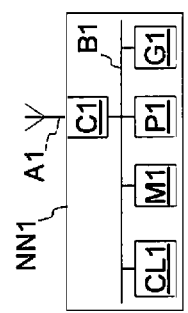
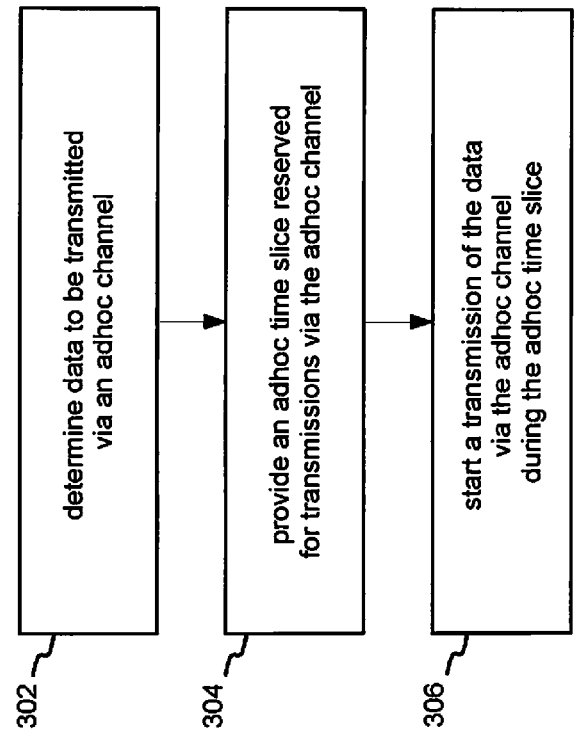
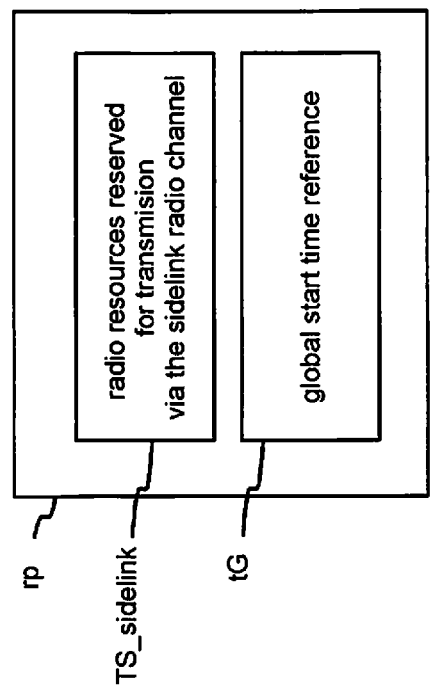

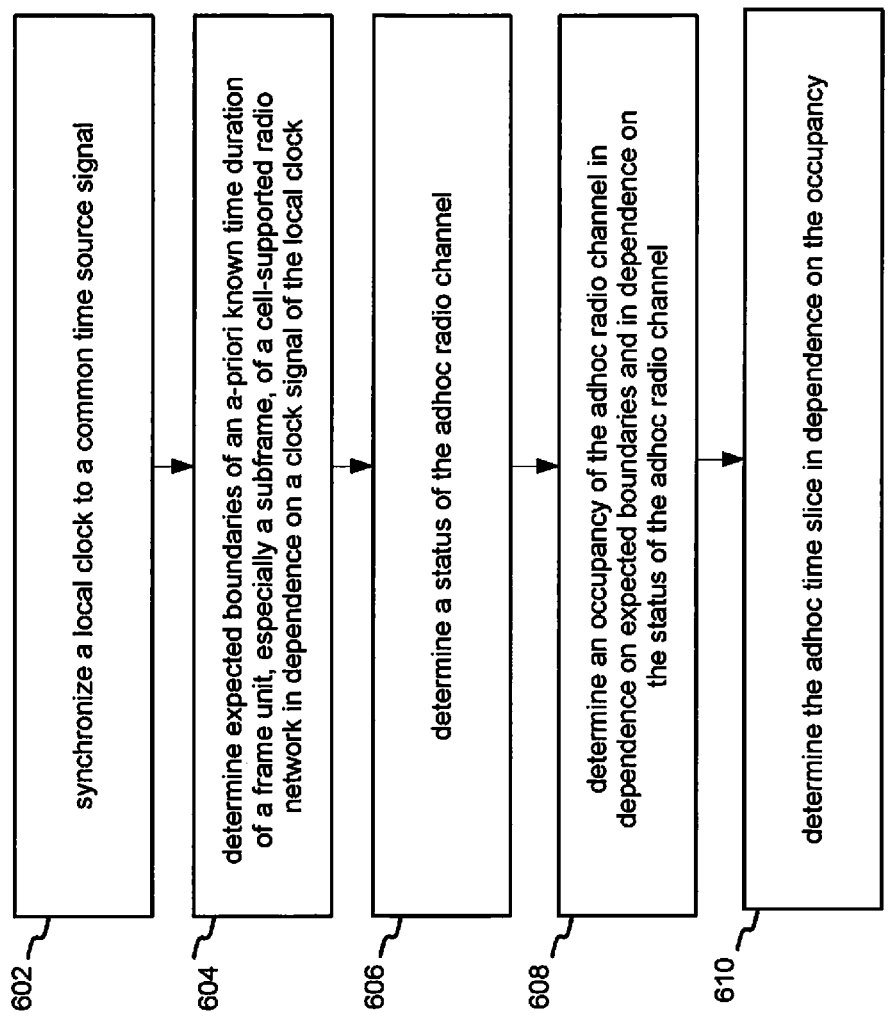

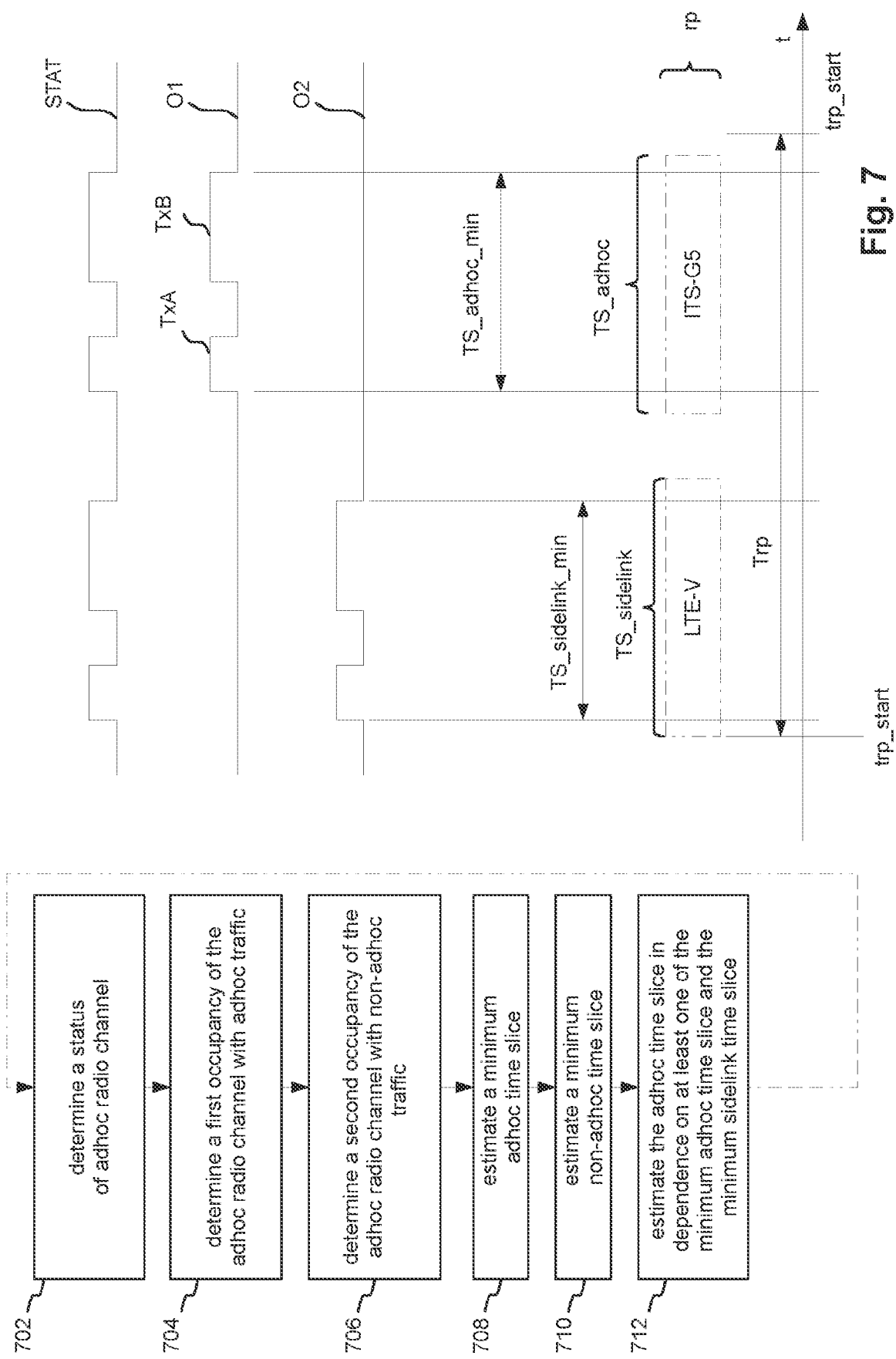

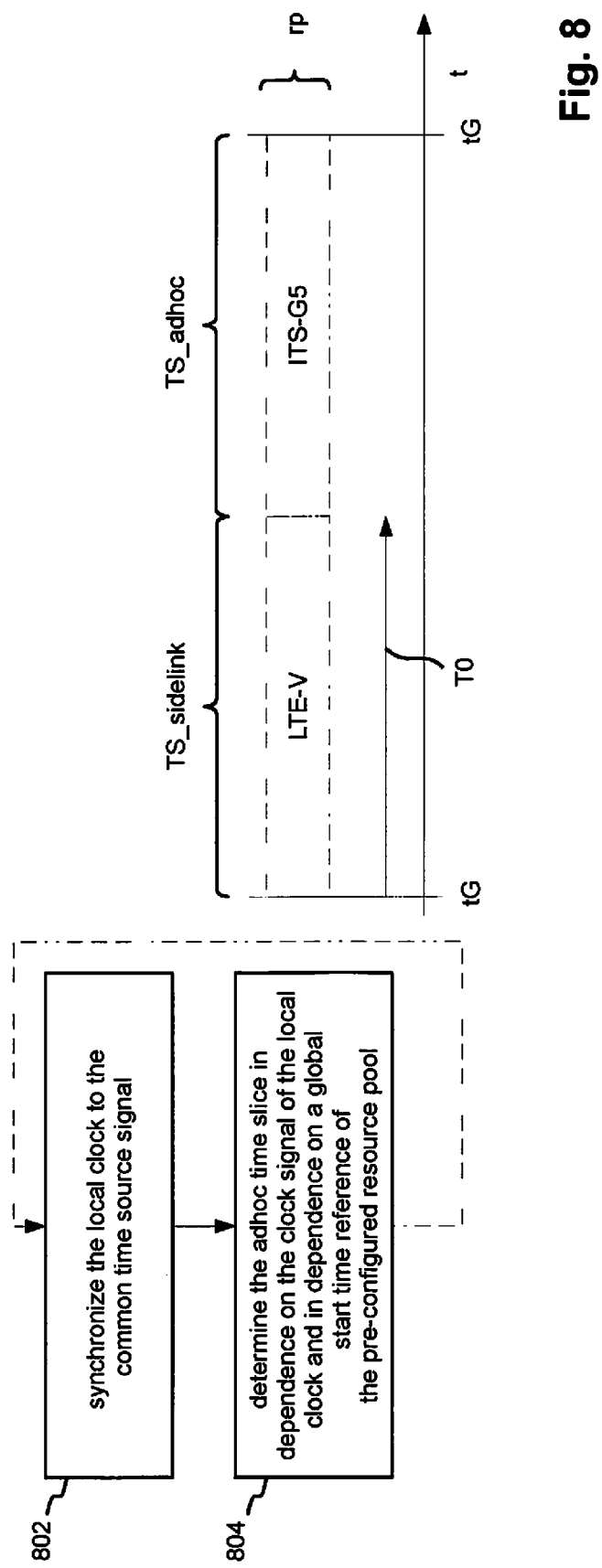

ROAD-SIDE NETWORK NODE AND METHOD TO OPERATE THE ROAD-SIDE NETWORK NODE

FIELD

The present invention is directed to a road-side network node, and a method to operate the road-side node.

BACKGROUND INFORMATION

State-of-the-art vehicles are able to exchange information with other vehicles in their vicinity (V2V: Vehicle to Vehicle). Also, vehicles with roadside infrastructure can communicate wirelessly (V2I: Vehicle to Infrastructure). Likewise, the vehicle can communicate wirelessly with a backend server in the Internet (V2N: Vehicle to Network) or with a pedestrian terminal (V2P: Vehicle to Person). Overall, this communication is referred to as Vehicle-to-Everything (V2X).

The development of new functions and services in the automotive industry such as automated driving benefits from V2X. Road safety, ride comfort and energy and traffic efficiency can be improved. This leads to new products and business models for automakers, automotive suppliers and other service providers.

The first generation of V2X applications to be deployed in the coming years is primarily related to road application. Their goal is to provide the driver with information about the road environment. Vehicles periodically provide status information (e.g., position, speed, acceleration, etc.) and/or event information (rescue mission, vehicle stagnant, traffic jam). This information is usually issued locally in the form of text messages. From neighboring vehicles, this event-based information can be sent to a central network unit (base Station, backend).

SUMMARY

In accordance with the present invention, an example road-side network node, and an example method to operate the road-side node are provided.

According to an aspect of the present invention, an example road-side network node for operation in an adhoc radio communications network is provided. The example road-side network node comprises a processor, a memory, a radio module, and an antenna. The road-side network node is configured to: determine data to be transmitted via an adhoc radio channel; determine or provide an adhoc time slice reserved for transmissions via the adhoc radio channel; and start a transmission of the data via the adhoc radio channel during the adhoc time slice.

Advantageously the first road-side network node will transmit data semi-synchronized to radio transmissions of a cell-supported radio communications network, therefore reducing or omitting interference with the cell-supported radio communications network. A coexistence mechanism is provided to allow the adhoc radio communications network and the cell-supported radio communications network to operate in the same or overlapping unlicensed frequency range.

According to an advantageous embodiment of the present invention, the road-side network node is configured to: synchronize a local clock to a common time source signal; determine expected boundaries of an a-priori known time duration of a frame unit, especially determining subframe boundaries, of a cell-supported radio communications network in dependence on a clock signal of the local clock; determine a status of the adhoc radio channel; and determine an occupancy of the adhoc radio channel in dependence on the expected boundaries and in dependence on the status of the adhoc radio channel; and determine the adhoc time slice in dependence on the occupancy.

An occupancy pattern is estimated and a discrimination can be made between adhoc traffic and further traffic occupying the adhoc radio channel. Furthermore, the adhoc time slice provides a measure to reduce interference between the adhoc channel and the sidelink channel of the cell-supported radio communications network. Advantageously, the provision of a pre-configured resource pool can be avoided therefore reducing configuration overhead.

According to an advantageous embodiment of the present invention, the road-side network node is configured to determine the occupancy as a first occupancy of the adhoc radio channel with adhoc traffic, when the status indicates a contiguous transmission with at least one transmission boundary not being an expected boundary.

Advantageously, the determination of the first occupancy allows that a difference can be made between adhoc traffic and non-adhoc traffic.

According to an advantageous embodiment of the present invention, the road-side network node is configured to determine the occupancy as a second occupancy of the adhoc radio channel with non-adhoc traffic, when the status indicates a contiguous transmission with both transmission boundaries being an expected boundary.

Advantageously, the determination of the second occupancy allows that a difference can be made between adhoc traffic and non-adhoc traffic According to an advantageous embodiment of the present invention, the adhoc time slice is provided via a pre-configured resource pool.

Advantageously a pre-configured resource pool or a subset of an LTE-V resource pool can be provided. The resource-pool enables the road-side network node to transmit data according to a time division multiplex scheme. Therefore, a coexistence with other technologies like LTE-V is provided. Moreover, processing overhead is omitted.

According to an advantageous embodiment of the present invention, the road-side network node is configured to: synchronize the local clock to the common time source signal; determine the adhoc time slice in dependence on the clock signal of the local clock and in dependence on a global start time reference of the pre-configured resource pool.

According to an advantageous embodiment of the present invention, the road-side network node is configured to: start a transmission of the data via the adhoc radio channel during one of the adhoc time slices omitting the start during a guard interval arranged at the end of the adhoc time slice.

Advantageously, the omission of a Start of an adhoc transmission during the guard interval provides that no or less adhoc transmission will interfere with transmissions in the non-adhoc time slice, ea. a sidelink time slice, following the adhoc time slice.

According to a further aspect of the present invention, a method to operate a road-side network node is provided. The method comprises: determining data to be transmitted via an adhoc radio channel; determining or providing an adhoc time slice reserved for transmissions via the adhoc radio channel; and starting a transmission of the data via the adhoc radio channel during the adhoc time slice.

Further features and advantages of the present invention are described below in the context of example embodiments.

BRIEF DESCRIPTION OF THE DRAWINGS

FIG. 2a depicts schematically a road-side network unit.

FIG. 2b depicts schematically a resource pool.

FIG. 3 depicts schematically a flow chart for operating the road-side node.

FIG. 6 depicts schematically a further flow chart for operating the road-side node.

FIG. 7 depicts schematically a further flow chart for operating the road-side node.

FIG. 8 depicts schematically a further flow chart for operating the road-side node.

DETAILED DESCRIPTION OF EXAMPLE EMBODIMENTS

Figure 1:
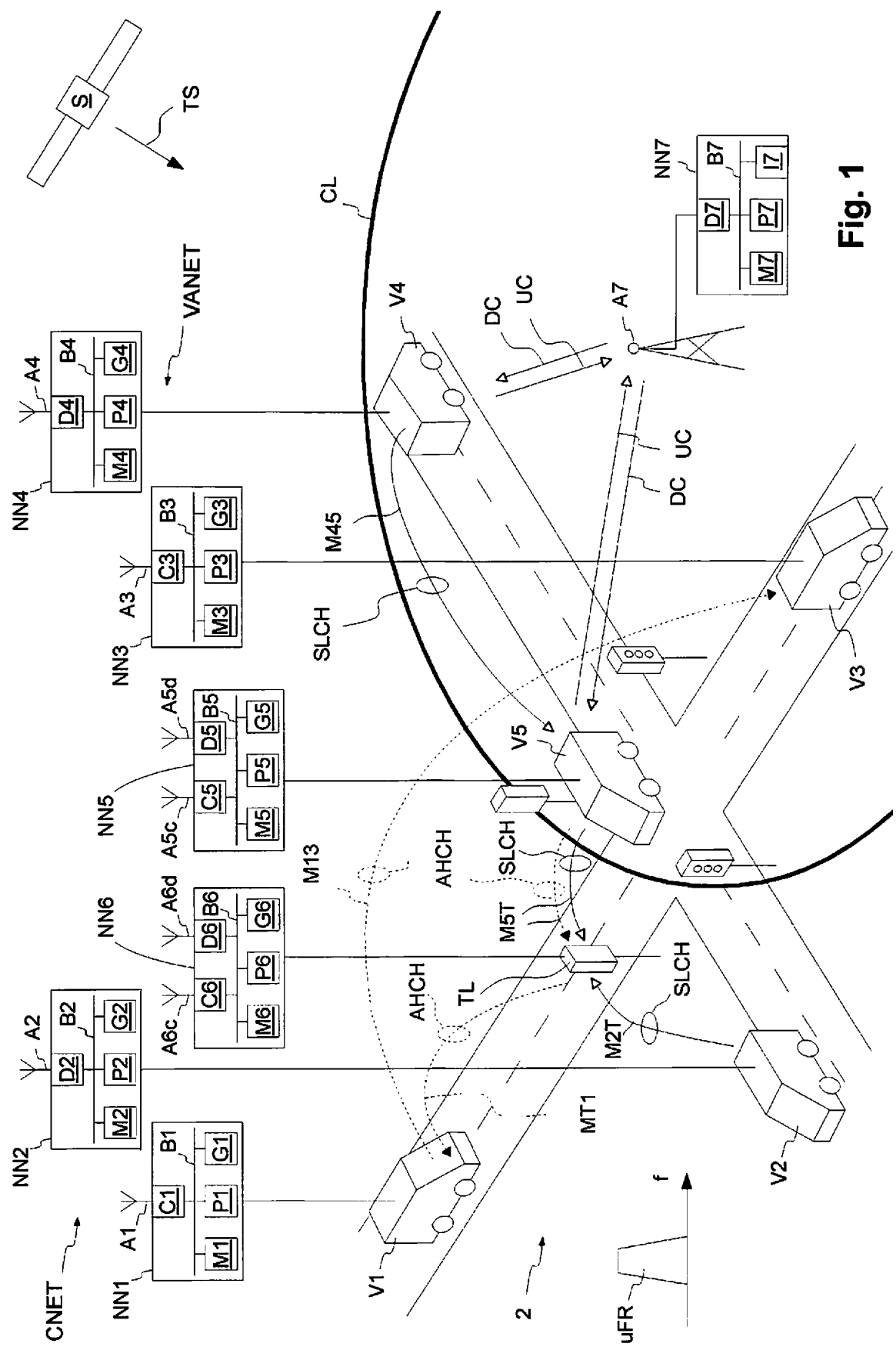
FIG. 1 depicts a schematic perspective view of an exemplary traffic situation.

FIG. 1 depicts a schematic perspective view of an exemplary traffic situation around a traffic lights crossing 2. Each vehicle V1, V3 comprises a network node NN1, NN3 forming an adhoc radio communications network VANET. Each vehicle V2, V4 comprises a network node NN2, NN4, which form a cell-supported radio communications network CNET. A vehicle V5 and a traffic light TL comprise a network node NN5, NN6, which are configured to participate in the adhoc radio communications network VANET and the cell-supported radio communications network CNET. Of course also other fixed infrastructure entities besides traffic lights may comprise a network node like NN1, NN2, or NN6.

Each one of network nodes NN1, NN2, NN3, NN4, NN5, NN6, and NN7 comprises a data bus B1, B2, B3, B4, B5, B6, and B7 interconnecting at least a processor P1, P2, P3, P4, P5, P6, and P7, a memory M1, M2, M3, M4, M5, M6, and M7, and a satellite receiver G1, G2, G3, G4, G5, G6, and G7. The network nodes NN1, NN2, NN3, NN4, NN5, NN6 are road-side network nodes, which means that these network nodes are installed in a vehicle or a road infrastructure. The network node NN7 is a network infrastructure node, which means that this node is configured to manage network functions. The satellite receiver G1, G2, G3, G4, G5, G6, and G7 is configured to receive at least one satellite Signal TS, for example a GPS, Global Positioning System, Signal, originating from an earth satellite S. On each of the memory M1, M2, M3, M4, M5, M6, and M7 a computer program is stored, which implements the methods disclosed in this description when executed on the corresponding processor P1, P2, P3, P4, P5, P6, and P7. Alternatively or additionally, the processors P1, P2, P3, P4, P5, P6, and P7 are implemented as ASIC. Each one of the network nodes NN1, NN3 comprises a radio module C1, C3 configured for the transmission and reception of radio signals according to the adhoc radio communications network VANET. Each one of the radio modules C1, C3 is connected to an antenna A1, A3. Each one of the network nodes NN2, NN4 comprises a radio module D2, D4 configured for the transmission and reception of radio signals according to the cell-supported radio communications network CNET. Each one of the radio modules D2, D4 is connected to an antenna A2, A4. Each one of the network nodes NN5, NN6 comprises a radio module D5, D6 configured for the transmission and reception of radio signals according to the cell-supported radio communications network CNET, and a radio module C5, C5 configured for the transmission and reception of radio signals according to the adhoc radio communications network VANET. Each one of the radio modules D5, D6 is connected to an antenna A5d, A6d. Each one of the radio modules C5, C6 is connected to an antenna A5c, A6c.

National authorities such as the "Bundesnetzagentur" of the Federal Republic of Germany draw up a frequency usage plan which, for example, includes licenses for the different network operators. The network operator is allowed, under the assigned license, to connect the network infrastructure nodes and network nodes in an assigned licensed frequency range or frequency spectrum. In contrast, there are frequency ranges or frequency spectra which are not assigned to any network operator and can be freely used under certain boundary conditions such as, for example, dedicated transmission/reception power.

The network VANET provides an adhoc radio channel AHCH. The network CNET provides the sidelink radio channel SLCH. Each one of the sidelink radio channel SLCH and the adhoc radio channel AHCH is an instance of wireless medium, WM, use for the purpose of passing physical layer, PHY, protocol data units, PDUs, between two or more network nodes. In both networks VANET and CNET radio signals are transmitted using the same or overlapping unlicensed frequency range uFR. Uncoordinated use of the channels SLCH and AHCH would lead to a deterioration of at least one of both channels SLCH and AHCH.

The network infrastructure node NN7 comprises a network interface I7 for accessing other network nodes for example of a backhaul network. The network infrastructure node NN7 can also be designated as a base Station or eNodeB. The network infrastructure node NN7 is connected to a stationary antenna A7 to send data on a downlink channel DC and to receive data on an uplink channel UC. The antenna A7 comprises, for example, a number of antennas and is designed, for example, as a remote radio head, RRH. Of course, the network infrastructure node NN7 can be realized in a distributed manner, for example in the context of a virtualization, and may consist of a plurality of separated network nodes. The network infrastructure node NN7 and the roadside network nodes NN2, NN4, NN5 and NN6 are configured according to the LTE-V2X standard, for example.

The network infrastructure node NN7 and the antenna A7 provide a radio CL within which the roadside network nodes NN5 and NN4 are in-coverage and are able to communicate with the network infrastructure node NN7. On the other hand, the network nodes NN2 and NN5 do not reside within the radio CL, are out-of-coverage with regard to the network infrastructure node NN7 and are not able to communicate directly with the network infrastructure node NN7.

The sidelink radio channel SLCH and a sidelink in general are defined, for example, by document 3GPP TS 36.300 V14.2.0 (2017 March), which is incorporated herein by reference. The network nodes NN2, NN4, NN5 and NN6 are configured according to 3GPP TS 36.300 V14.2.0 (2017 March). The sidelink includes sidelink discovery, and V2X sidelink communication. The sidelink uses uplink resources and a physical channel structure similar to the uplink. The sidelink thus differs from the uplink with respect to the physical channel.

The sidelink is limited to individual cluster transmission for the sidelink physical channels. Furthermore, the sidelink uses a 1-symbol gap at the end of each sidelink subframe. For V2X sidelink communication, PSCCH, Physical Sidelink Control Channel, and PSSCH, Physical Sidelink Shared Channel, are transmitted in the same subframe.

Physical layer processing of transport channels in the sidelink differs from uplink transmission in the following steps: Scrambling: For PSDCH, Physical Sidelink Discovery Channel, and PSCCH, scrambling is not specific to the network entity; Modulation: 64 QAM and 256 QAM are not supported for the Sidelink (QAM: Quadrature amplitude modulation). The PSCCH indicates sidelink resources and other transmission parameters used by the respective network node for the PSSCH.

For PSDCH, PSCCH and PSSCH demodulation, reference signals similar to the uplink demodulation reference signals in the 4th symbol of the slot are transmitted in the normal CP, Cyclic Prefix, and in the third symbol of the slot in the extended CP. The sidelink demodulation reference signal sequence length corresponds to the size (number of subcarriers) of the associated resource. For V2X Sidelink communication, reference signals are transmitted in the 3rd and 6th symbols of the first slot and in the 2nd and 5th symbols of the second slot in the CP. For PSDCH and PSCCH, reference signals are generated based on a fixed base sequence, cyclic shift and orthogonal cover code. For V2X sidelink communication, the cyclic shift for PSCCH is randomly selected on each transmission.

For measurements of the sidelink radio channel, the following options are available on the side of the network nodes: Receiving power of the sidelink reference signal (S-RSRP); Receive power of the sidelink discovery reference signal (SD-RSRP); Received power of the PSSCH reference signal (PSSCH-RSRP); Signal strength indicator for Sidelink reference signals (S-RSSI).

A sidelink resource pool can be provided pre-configured, semi-static, or dynamically and corresponds to a set of radio resources capable of performing a sidelink transmission via the sidelink radio channel SLCH. A network node performing sidelink communication in a mode 2 (uncovered case) autonomously selects a resource from a resource pool range, which is configured by the network infrastructure node NN7 or a headend of a sidelink duster in advance. A network node performing sidelink communication in a mode 1 (covered case) selects a resource which has been scheduled by the network infrastructure node NN7.

Each one of network nodes NN1, NN3, NN5, NN6 is configured, for example, according to the IEEE 802.11p standard, especially IEEE 802.11p-2010 dated Jul. 15, 2010 which is incorporated herein by reference. The IEEE 802.11p PHY and MAC provide services for upper layer protocols for Dedicated Short-Range Communications, DSRC, in the US and for Cooperative ITS, C-ITS, in Europe. The network nodes NN1, NN3, NN5, NN6 communicate directly with each other via an adhoc radio channel AHCH in the unlicensed frequency range. The adhoc radio channel AHCH is arbitrated via a CSMA/CA (Carrier Sense Multiple Access/Collision Avoidance) protocol by radio modules C1, C3, C5, C6.

The network node NN1 is configured to transmit data via the adhoc radio channel AHCH and the network node NN3 can receive the data. All network nodes in the reception range of the radio signal as for example the network node NN3 are able to receive such data. The adhoc radio channel AHCH and an adhoc radio channel in general and the ad hoc wireless communication network VANET are described, for example, by the IEEE Standard "802.11p-2010—IEEE Standard for Information Technology—Local and Metropolitan Area Networks—" Specific Part 11: Wireless U\N Medium Access Control (MAC) and Physical Layer (PHY) Specifications Amendment 6: Wireless Access in Vehicular Environments, which is incorporated herein by reference. IEEE 802.11p is a standard forextending the WLAN Standard IEEE 802.11. The goal of IEEE 802.11p is to establish wireless technology in passenger vehicles and to provide a reliable interface for Intelligent Transport Systems (ITS) applications. IEEE 802.11p is also the basis for Dedicated Short Range Communication (DSRC) in the 5.85 to 5.925 GHz band. To avoid confusion with the European DSRC version, the term ITS-G5 is used rather than DSRC, especially in Europe.

To access the adhoc radio channel AHCH the network node NN1, NN3, NN5 and NN6 use an enhanced distributed channel access, EDCA, and a listen-before-talk, LBT, procedure. The LBT comprises a backoff procedure prior to transmitting on the adhoc radio channel AHCH. First the network node NN1, NN3, NN5 or NN6 listens and waits until the adhoc radio channel AHCH is available during a period of time, the period of time AIFS being termed as arbitration inter-frame space AIFS. The adhoc radio channel AHCH is sensed idle if a power level is lower than a first threshold value like 62 dBm and no adhoc preamble with a power level higher than a second threshold value like −82 dBm is determined. The adhoc radio channel is busy if the channel is not sensed idle.

If the adhoc radio channel AHCH is sensed idle during the period of time AIFS, the backoff procedure starts. A backoff timer is initialized as a random number being multiples of a 9 ps slot time. The random number is determined within a contention window. The random backoff timer is decreased by one when the adhoc radio channel AHCH is sensed idle. For each slot time the adhoc radio channel AHCH is sensed busy the random backoff timer remains with the same value as before.

The network node NN1, NN3, NN5 or NN6 obtains a transmission opportunity TXOP if the backoff timer expires. If the network node NN1, NN3, NN5 or NN6 senses the adhoc radio channel as idle, it will transmit the data, if a transmission opportunity TXOP duration has not expired.

The receiving network node among the network nodes NN1, NN3, NN5, and NN6 will send an acknowledgement to the sending node upon reception of the data if the data was not transmitted in a broadcast mode.

The document "ETSI EN 302 663 V1.2.0 (2012 November)", which is incorporated herein by reference, describes both lowermost layers of ITS-G5 technology (ITS G5: Intelligent Transport Systems operating in the 5 GHz frequency band), the physical layer and the data link layer. The radio modules C1, C3, C5, and C6 realize, for example, these two lowest layers and corresponding functions according to "ETSI TS 102 687 V1.1.1 (2011 July)" in order to use the adhoc radio channel. The following unlicensed frequency bands are available in Europe for the use of the adhoc radio channel AHCH, which are part of the unlicensed frequency band NLFB: 1) ITS-G5A for safety-relevant applications in the frequency range 5.875 GHz to 5.905 GHz; 2) ITS-G5B for non-safety related applications in the frequency range 5,855 GHz to 5,875 GHz; and 3) ITS-G5D for the operation of ITS applications in the 5.055 GHz to 5.925 GHz frequency range. ITS-G5 allows communication between the two network units UE1 and UE2 out of the context of a base station. The ITS-G5 enables the immediate exchange of data frames and avoids the management overhead that is used when setting up a network.

The document "ETSI TS 102 687 V1.1.1 (2011 July)", which is incorporated herein by reference, describes for ITS-G5 a "Decentralized Congestion Control Mechanism". Among other things, the adhoc radio channel AHCH serves to exchange traffic safety and traffic efficiency data. The radio modules C1, C3, C5, and C6 realize, for example, the functions as described in the document "ETSI TS 102 687 V1.1.1 (2011 July)". The applications and services in the ITS-G5 are based on the cooperative behavior of the roadside network nodes that make up the adhoc network VANET (VANET: vehicular ad hoc network). The adhoc network VANET enables time-critical road traffic applications that require rapid Information exchange to alert and assist the driver and/or vehicle in good time. To ensure proper functioning of the adhoc network VANET, "Decentralized Congestion Control Mechanisms" (DCC) is used for the adhoc radio channel AHCH of ITS-G5. DCC has features that reside on multiple layers of the ITS architecture. The DCC mechanisms are based on knowledge about the channel. The channel state information is obtained by channel probing. Channel state information can be obtained by the methods TPC (transmit power control), TRC (transmit rate control) and TDC (transmit datarate control). The methods determine the channel state information in response to received signal level thresholds or preamble information from detected packets.

The adhoc radio communications network VANET and the cell-supported radio communications network CNET differ in various aspects—Differences between both technologies are already present in the coding/decoding chain, therefore in modulation and coding schemes. This does not allow a successful decoding of a received signal of the other technology. Different reference symbols are used in a different way: sidelink reference symbols are transmitted at certain radio resources during a transmission via the sidelink radio channel SLCH. On the other hand, adhoc reference symbols are transmitted at the beginning of a transmission via the adhoc radio channel AHCH. Moreover, the transmission via the sidelink radio channel SLCH requires that the participating network nodes are synchronized in time in order to correctly decode the received signal. The adhoc radio channel on the other hand allows connectionless, unsynchronized transmission of signals.

In the shown traffic situation the network nodes NN1 to NN6 are located such, that the radio power of each network nodes NN1 to NN6 is sufficient to reach another one of the network nodes NN1 to NN6. Thus, transmissions on the channels AHCH and SLCH which overlap in frequency can adversely affect each other. One aim of this description is to reduce this disadvantageous mutual influence.

For example, the vehicle V5 is an emergency vehicle in emergency operation and communicates its emergency status in a message M5T via the adhoc radio channel ADCH and the sidelink radio channel to the traffic light TL. The network node NN5 is configured to transmit a message via the sidelink radio channel SLCH and/or via the adhoc radio channel AHCH, which can be received by the network node NN6. As both network nodes NN5 and NN6 comprise the radio modules C5, D5, C6, D6 for both networks CNET and VANT, the access to both technologies is possible. The network nodes NN5 and NN6 can also be termed gateway nodes. The sidelink radio channel SLCH between the network nodes NN5 and NN6 is operated in the distributed mode.

In dependence of the received message the traffic light TL closes the crossing for cross traffic. Upon switching to red the traffic light communicates its red-light status in a message MT1 via the adhoc radio channel AHCH to the vehicle V1 in order to reduce its speed. The vehicle V1 moves with a speed of 100 km/h and communicates the speed in a message M13 via the adhoc radio channel ADCH to the other vehicle, e.g., vehicle V3.

The network node NN2 is configured to transmit a message M2T via the sidelink radio channel SLCH to the network node NN6. As both network nodes NN2 and NN6 reside outside the radio cell CL, the access to the sidelink radio channel SLCH is not controlled by a network infrastructure node. The sidelink radio channel SLCH between the network nodes NN2 and NN6 is operated in the distributed mode.

The network node NN4 is configured to transmit a message M45 via the sidelink radio channel SLCH to the network node NN5. As both network nodes NN4 and NN5 reside in the radio cell CL, the access to the sidelink radio channel is controlled by the network infrastructure node NN7. The sidelink radio channel SLCH between the network nodes NN4 and NN5 is operated in mode 1 or managed mode, which means that the network infrastructure node NN7 controls the transmission on the sidelink radio channel SLCH via corresponding scheduling assignments SA in the downlink channel DC. The network infrastructure node NN7 comprises a scheduler which determines the scheduling assignments SA for the sidelink radio channel SLCH. The scheduling assignments SA are control signals transmitted via the downlink channel DC and indicate which sidelink radio resource are to be used by the network nodes NN4, NN5 to transmit the data via the sidelink. The scheduling assignments SA are determined in such a way that collisions are avoided and interference is minimized. This is of great importance under high network load, as the scheduler entity is able to guarantee a Quality-of-Service (QoS), e.g., data rate, data reliability, packet error ratio, or delay, to different applications by allocating sidelink radio resources to each network node NN4, NN5 based on the service quality requirements of the application. The data transmissions associated with the scheduling assignments SA can occupy adjacent resource blocks RB in the same sub-frame or non-adjacent RBs depending on the latency required by the application. The scheduling and the control by the network infrastructure node NN7 can only be performed in areas where the Signals of the node NN7 are available (in-coverage). In this mode the scheduling and interference management of radio traffic is assisted by the network infrastructure node NN7 via control signaling over the downlink channel DC. The network infrastructure node NN7 assigns for each network node the resources (ea. time and frequency ranges) to be used for the sidelink in a dynamic manner.

Since services should be available everywhere including areas where no network coverage by a network infrastructure node NN7 is available, there is a further configuration or deployment mode for the sidelink radio channel SLCH, namely the distributed mode. In the distributed mode the scheduling and interference management of radio traffic is supported based on distributed algorithms implemented between the network nodes, for example NN2 and NN5. These distributed algorithms are based on sensing with semi-persistent transmission based on the fact that the radio traffic generated by each network node NN2, NN5 is mostly periodic in nature. This technique enables sensing the occupation of a radio resource and estimate the future congestion on it. This optimizes the use of the sidelink by enhancing resource separation between transmitters that are using overlapping resources. Additionally, a mechanism where resource allocation is dependent on geographical information is able to reduce the number of network nodes competing for the same resources which reduces the collision probability. The distributed mode is mainly used in out-of-coverage scenarios and designated also as non-cell-supported mode. Consequently, the cell-supported communications network CNET provides the cell-supported mode (in-coverage) and the distributed mode (out-of-coverage). Even out-of-coverage the network CNET is termed cell-assisted radio communications network.

Both modes are defined to use a dedicated carrier for radio communications, meaning the spectrum band is only used for the direct side-link based V2V Communications. The design is scalable for different bandwidths (e.g., 10 MHz or multitudes of 10 MHz). For time synchronization GNSS, Global Navigation Satellite System, is used in both cases.

In this description, reference is made to a single uplink channel and a single downlink channel. For example, the uplink channel and the downlink channel include respective subchannels. Several channels can be used in the uplink as well as in the downlink. The same applies to the sidelink radio channel SLCH and the adhoc radio channel AHCH.

FIG. 2a depicts schematically the first road-side network node NN1. In addition to the embodiment of FIG. 1 the network node NN1 comprises a local lock CL1. The local clock CL1 is synchronized via the satellite receiver G1, which receives the satellite signal which represents a common time source signal for other road-side network nodes. In another embodiment the local clock CL1 is synchronized via another type of common time source signal, for example a precision time protocol, PTP, signal. The synchronization of the local clock comprises: setting a timestamp according to a global reference in dependence on the common time source signal, setting a frequency of the local clock in dependence on the common time source signal, and setting a phase of the local clock in dependence on the common time source signal.

FIG. 2b depicts schematically a resource pool rp. The resource pool rp comprises at least sidelink time slice TS_sidelink indicating radio resources being reserved for a transmission in via the sidelink radio channel. This information implicitly states a resource pool cycle, which indicates a repetition rate of the resource pool. This information implicitly states that omitted radio resources in time can be used by the adhoc radio channel. Furthermore, the resource pool comprises a global start time reference tG which indicates a point in time with reference to a global time. This point in time indicates on a global time scale where the resource pool is located.

FIG. 3 depicts schematically a flow chart for operating the adhoc-capable network node NN1, NN3, NN5 or NN6 of FIG. 1. Data to be transmitted via an adhoc radio channel is determined in a step 302. An adhoc time slice reserved for transmissions via the adhoc radio channel is determined or provided in a step 304. A transmission of the data via the adhoc radio channel is started during one of the adhoc time slice in a step 306. The adhoc time slice is reserved for transmission via the adhoc radio channel; other time slices different from adhoc time slices are not used by adhoc-capable network node.

Figure 4:
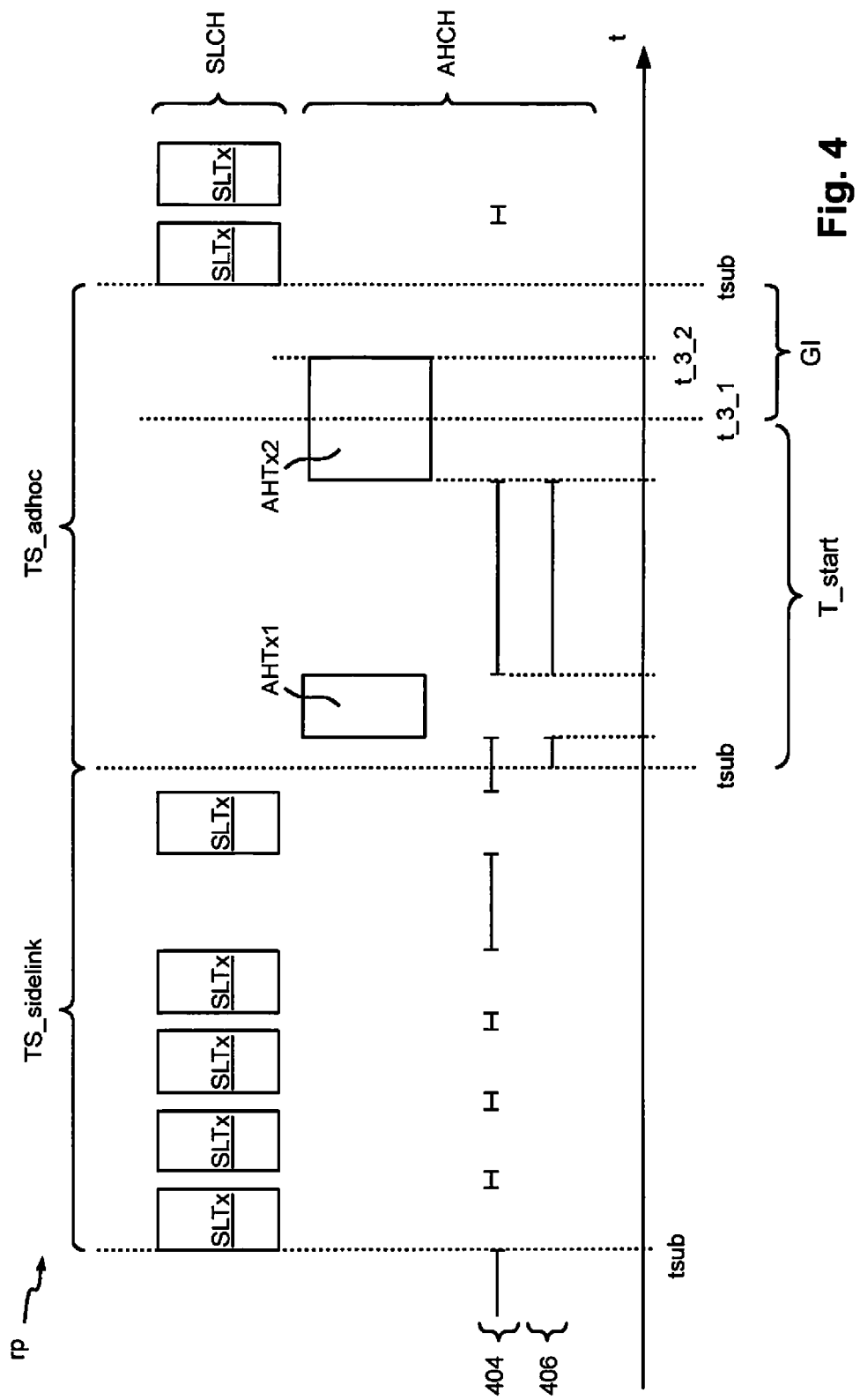
FIG. 4 depicts schematically an occupancy of a sidelink radio channel and an adhoc radio channel.

FIG. 4 depicts schematically an occupancy of the sidelink radio channel and the adhoc radio channel. The resource pool rp comprises the information about a sidelink TDM-channel and an adhoc TDM-channel (TDM: time division multiplex), each comprising time slices indicating an exclusive reservation for the respective channel. Therefore, the resource pool rp comprises set of radio resources, which are available for sidelink radio channel transmission and the adhoc radio channel transmission in a time division multiple access manner.

The blocks SLTx indicate a transmission via the sidelink radio channel SLCH and the blocks AHtx indicate a transmission via the adhoc radio channel AHCH. After a sidelink radio channel transmission SLTx. According to section 404 one of the network nodes accessing the adhoc radio channel will sense the medium as idle. Section 406 illustrates that when the backoff-timer of the listen-before-talk procedure reaches Zero, the network node will transmit data via the adhoc radio channel AHCH according to the blocks AHTx1 and AHTx2.

During the sidelink time slices of the sidelink TDM-channel each one of the sidelink capable network nodes will determine that a sidelink time slice is available for transmitting via the sidelink radio channel. A TDM-channel is different from a radio channel in the sense that the radio channel is used to transmit data via physical radio resources. The TDM-channel provides time slices of the physical radio resources being available for the sidelink radio channel or the adhoc radio channel.

During a sidelink time slice TS_sidelink sidelink-capable network nodes transmit data SLTx in synchronized manner via the sidelink radio channel SLCH. The adhoc-capable network nodes are allowed to transmit data AHTx1 and AHTx2 during the adhoc time slice TS_adhoc. The adhoc-capable network node receives or determines the guard interval GI at the end of the adhoc time slice TS_adhoc, where no start of adhoc transmission is allowed. A start of transmission via the adhoc radio channel ADCH is allowed during the time interval T_start. The guard interval G1 represents a maximum transmission duration via the adhoc radio channel. So, from a point in time t_3_1 on until the end of the time slice TS_adhoc no transmission start via the adhoc radio channel is allowed. The time t_3_1 is determined as the subsequent subframe border tsub minus an adhoc frame time, which can be determined a maximum or mean frame time on the adhoc radio channel.

Figure 5:
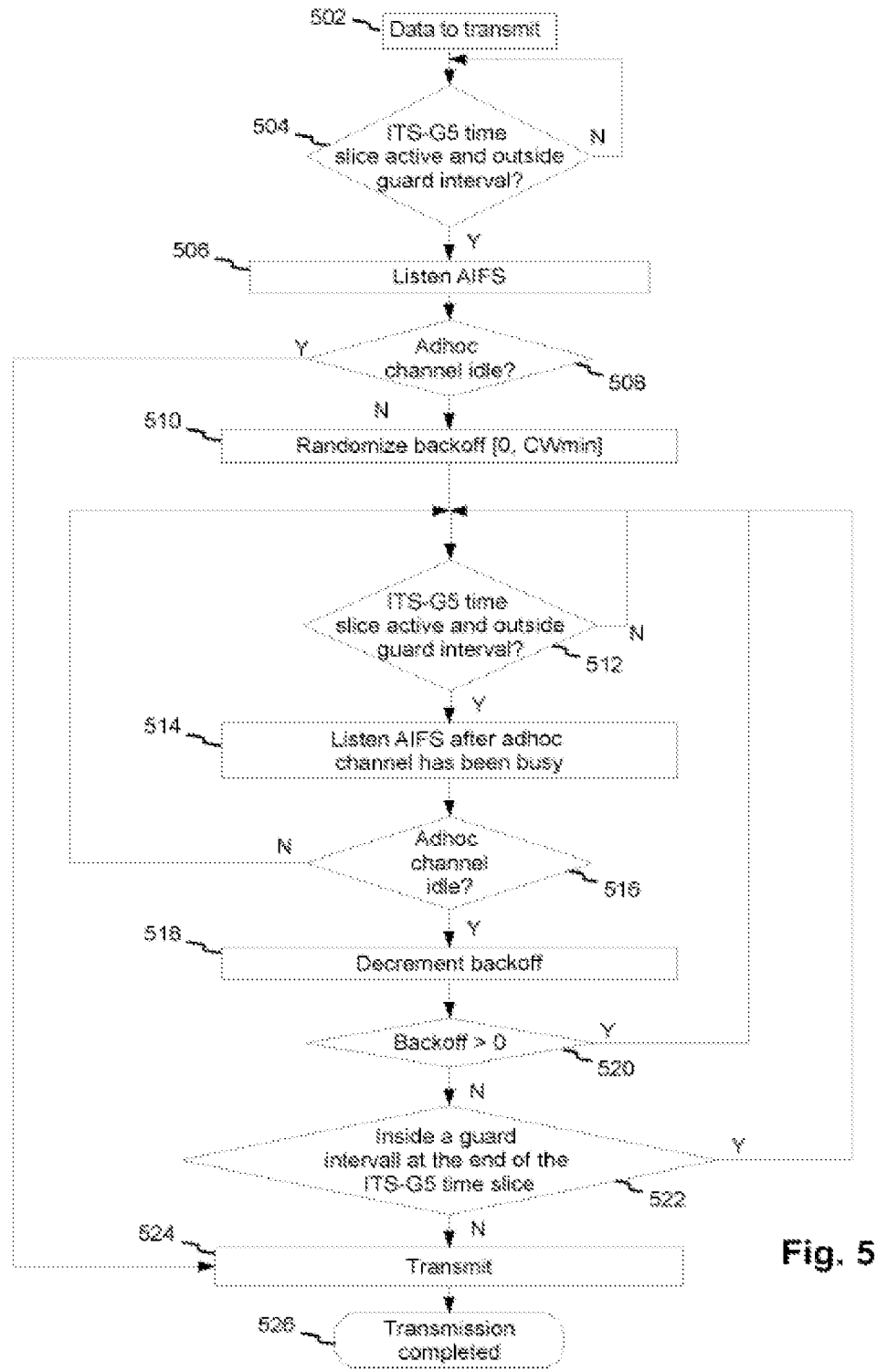
FIG. 5 depicts schematically a flow chart for operating the road-side node.

FIG. 5 depicts schematically a flow chart for operating the adhoc-capable road-side node. When the adhoc-capable network node determines data to transmit in a step 502, it checks in a step 504 whether the network node is in an adhoc time-slice TS_adhoc but out of the guard interval. If the affirmative, the network node listens the adhoc radio channel in a step 506. When the adhoc radio channel is determined idle in a step 508, then the network node starts to transmit the data via the adhoc radio channel in a step 524. In a step 526 the transmission via the adhoc radio channel is completed.

If the network node determines in the step 508 that the adhoc radio channel is busy, a backoff timer is initialized with a random number in a step 510. The network node checks in a step 512 whether the network node is in an adhoc time-slice TS_adhoc but out of the guard interval. If the affirmative, the network node listens the adhoc radio channel in step 514. After the adhoc channel has been determined idle in a step 516, the backoff timer is decremented by one in a step 518. If the backoff timer is greater zero, the procedure continues with the step 512. If the backoff timer reaches zero, then the network node determines whether it is in the guard interval. If the affirmative, the procedure continues with the step 512, therefore omitting the start of transmission during the guard interval arranged at the end of the adhoc time slice TS_adhoc. If the network node is outside the guard interval, it will start with the transmission of the date in step 524.

FIG. 6 depicts schematically a further example flow chart for operating one of the adhoc-capable road-side nodes of FIG. 1. According to a step 602 the local clock is synchronized to the common time source signal. According to a step 604 the expected boundaries of an a-priori known time duration of a frame unit—for example of 1 ms of a subframe of the cell-supported radio communications network—are determined in dependence on the local clock signal. So, subframe boundaries, which fall onto a full millisecond, are known to the network node. In a step 604, an idle/busy status of the adhoc radio channel is determined for a period of time. According to a step 608 an occupancy of the adhoc radio channel is determined in dependence on the expected boundaries and in dependence on the status of the adhoc radio channel. To fall within the expected boundaries an interval around an exact point in time is defined. A subframe boundary of the cell-supported radio communications network is expected every full 1 ms. According to a step 610 the adhoc time slice is determined in dependence on the occupancy.

FIG. 7 depicts schematically a further example flow chart for operating one of the adhoc-capable road-side nodes of FIG. 1. The road-side node NN1 learns the resource pool rp or at least a part of it from observing the adhoc channel and comparing the channel listening result with a clock signal of the local dock. The local clock is synchronized to the common time source signal. In a step 702 the status STAT is determined in dependence on measuring a reception energy on the adhoc radio channel. A first occupancy of the adhoc radio channel with adhoc traffic is determined in a step 704. When the status STAT indicates a contiguous transmission TxA or TxB with at least one transmission boundary—the start or the end—not being an expected boundary, for example at or nearby a full microsecond, then the observed transmission TxA, TxB is considered adhoc traffic. In a step 706 a second occupancy 02 of the adhoc radio channel with non-adhoc traffic is determined. When the status indicates a contiguous transmission with both transmission boundaries being an expected boundary, then the observed transmission is considered being not adhoc traffic. According to a step 708 a minimum adhoc time slice is determined. According to a step 710 a minimum non-adhoc time slice is determined. In a step 712 the adhoc time slice TS_adhoc is determined in dependence on the minimum time slices. In the example shown the time slices TS_sidelink and TS_adhoc are determined to be greater than the respective minimum time slices as there is sufficient idle time between the determined minimum time slices.

In an example embodiment, the step 712 further comprises: estimating a resource pool duration Trp; estimating a start trp_start of a resource pool cycle. The start trp_start is a point in time where the resource pool starts. The next instance of the start trp_start will indicate the next adhoc time slice TS_adhoc. In an embodiment the steps 706 and 710 are omitted and the step 712 estimates the adhoc time slice TS_adhoc without knowledge of the non-adhoc traffic. In alternative embodiment the steps 704 and 708 are omitted and the step 712 estimates the adhoc time slice TS_adhoc without knowledge of the adhoc traffic.

FIG. 8 depicts schematically a further example flow chart for operating the road-side node NN1. In a step 802 the local clock is synchronized to the common time source signal. In a step 804 the adhoc time slice TS_adhoc is determined in dependence on the clock signal, in dependence on a global start time tG being part of the pre-configured resource pool, and in dependence on the radio resources in time, which are not assigned to the sidelink radio channel but to the adhoc radio channel. So, the adhoc-capable road-side network node is able to determine the adhoc time slice TS_adhoc in dependence on the global start time and a time offset T0 to the adhoc time slice.

The invention claimed is:

1. A road-side network node for operation in an adhoc radio communications network, the road-side network node comprising:
    a processor;
    a memory;
    a radio module; and
    an antenna;
    wherein the road-side network node is configured to:
        determine data to be transmitted via an adhoc radio channel;
        determine or provide an adhoc time slice reserved for transmissions via the adhoc radio channel in an adhoc radio communications network;
        synchronize a local clock to a common time source signal;
        determine expected boundaries of an a-priori known time duration of a frame unit, including determining subframe boundaries, of a sidelink radio channel of a cell-supported radio communications network in dependence on a clock signal of the local clock, the cell-supported radio communications network being different from the adhoc radio communications network, the sidelink radio channel being different from the adhoc radio channel, and wherein the sidelink radio channel and the adhoc radio channel operate in the same or overlapping frequency range as one another;
        determine a status of the adhoc radio channel;
        determine an occupancy of the adhoc radio channel in dependence on the expected boundaries and in dependence on the status of the adhoc radio channel;
        determine the adhoc time slice in dependence on the occupancy; and
        start a transmission of the data via the adhoc radio channel during the adhoc time slice;
        wherein road-side network node is configured to determine the adhoc time slice based on a pre-configured resource pool, the resource pool indicating first time slices reserved exclusively for transmission via the adhoc radio channel and second time slices reserved exclusively for transmission via the sidelink radio channel, the second time slices not overlapping with the first time slices;
        wherein the road-side network node is configured to learn at least part of the resource pool by listening to the adhoc radio channel and comparing a result of the listening with the clock signal of the local clock.

2. The road-side network node according to claim 1, wherein the road-side network node is configured to:
    determine the occupancy as a first occupancy of the adhoc radio channel with adhoc traffic, when the status indicates a contiguous transmission with at least one transmission boundary not being an expected boundary.

3. The road-side network node according to claim 1, wherein the road-side network node is configured to:
    determine the occupancy as a second occupancy of the adhoc radio channel with non-adhoc traffic, when the status indicates a contiguous transmission with both transmission boundaries being an expected boundary.

4. The road-side network node according to claim 1, wherein the road-side network node is configured to:
  determine the adhoc time slice in dependence on the clock signal of the local clock and in dependence on a global start time reference of the pre-configured resource pool.

5. The road-side network node according to claim 1, wherein the road-side network node is configured to:
  start the transmission of the data via the adhoc radio channel during one of the adhoc time slices omitting a start during a guard interval arranged at an end of the adhoc time slice.

6. The road-side network node as recited in claim 1, wherein the adhoc radio communications network is a VANET (vehicular ad-hoc network).

7. A method to operate a road-side network node, the method comprising the following steps:
  determining data to be transmitted via an adhoc radio channel in an adhoc radio communications network;
  determining or providing an adhoc time slice reserved for transmissions via the adhoc radio channel;
  synchronizing a local clock to a common time source signal;
  determining expected boundaries of an a-priori known time duration of a frame unit, including determining subframe boundaries, of a sidelink radio channel of a cell-supported radio communications network in dependence on a clock signal of the local clock, the cell-supported radio communications network being different from the adhoc radio communications network, the sidelink radio channel being different from the adhoc radio channel, and wherein the sidelink radio channel and the adhoc radio channel operate in the same or overlapping frequency range as one another;
  determining a status of the adhoc radio channel;
  determining an occupancy of the adhoc radio channel in dependence on the expected boundaries and in dependence on the status of the adhoc radio channel;
  determining the adhoc time slice in dependence on the occupancy; and
  starting a transmission of the data via the adhoc radio channel during the adhoc time slice;
  wherein the road-side network node determines the adhoc time slice based on a pre-configured resource pool, the resource pool indicating first time slices reserved exclusively for transmission via the adhoc radio channel and second time slices reserved exclusively for transmission via the sidelink radio channel, the second time slices not overlapping with the first time slices;
  wherein the road-side network node learns at least part of the resource pool by listening to the adhoc radio channel and comparing a result of the listening with the clock signal of the local clock.

8. The method as recited in claim 7, wherein the adhoc radio communications network is a VANET (vehicular ad-hoc network).

* * * * *